(12) United States Patent
Smith

(10) Patent No.: US 8,336,107 B2
(45) Date of Patent: Dec. 18, 2012

(54) SYSTEM AND METHODS FOR DEFENDING AGAINST ROOT

(75) Inventor: Fred Hewitt Smith, Old Town, ME (US)

(73) Assignee: Angel Secure Networks, Inc., Orono, ME (US)

(*) Notice: Subject to any disclaimer, the term of this patent is extended or adjusted under 35 U.S.C. 154(b) by 0 days.

(21) Appl. No.: 12/150,373

(22) Filed: Apr. 28, 2008

(65) Prior Publication Data

US 2009/0007233 A1 Jan. 1, 2009

Related U.S. Application Data

(60) Provisional application No. 60/926,614, filed on Apr. 27, 2007.

(51) Int. Cl.
*G06F 7/04* (2006.01)

(52) U.S. Cl. ............. 726/27; 726/14; 726/22; 726/26; 713/152; 713/164; 713/187

(58) Field of Classification Search .................. 726/27
See application file for complete search history.

(56) References Cited

U.S. PATENT DOCUMENTS

| | | | |
|---|---|---|---|
| 6,067,582 A | 5/2000 | Smith et al. | |
| 6,532,543 B1 | 3/2003 | Smith et al. | |
| 6,918,038 B1 | 7/2005 | Smith et al. | |
| 2002/0178271 A1* | 11/2002 | Graham et al. | 709/229 |
| 2005/0033980 A1* | 2/2005 | Willman et al. | 713/200 |
| 2006/0005250 A1* | 1/2006 | Chu et al. | 726/26 |
| 2007/0156897 A1* | 7/2007 | Lim | 709/225 |
| 2008/0127303 A1* | 5/2008 | Wrighton et al. | 726/2 |

OTHER PUBLICATIONS

Smalley et al., "A security Policy Configuration for the Security-Enhanced Linux" Feb. 2001, pp. 1-20.*
Smalley et al. "A security Policy Configuration for the Security-Enhanced Linux", Feb. 2001, 1-20.*

* cited by examiner

*Primary Examiner* — Shewaye Gelagay
(74) *Attorney, Agent, or Firm* — Guntin Meles & Gust, PLC; Ralph Trementozzi

(57) ABSTRACT

A method is disclosed for securing sensitive material on a computer system comprising a network of computers from unauthorized access by a root level user of the computer system, the method including the steps of: limiting access to the sensitive material to one or more authorized users; controlling the operation of one or more system functions to prevent unauthorized access to the sensitive material.

26 Claims, 9 Drawing Sheets

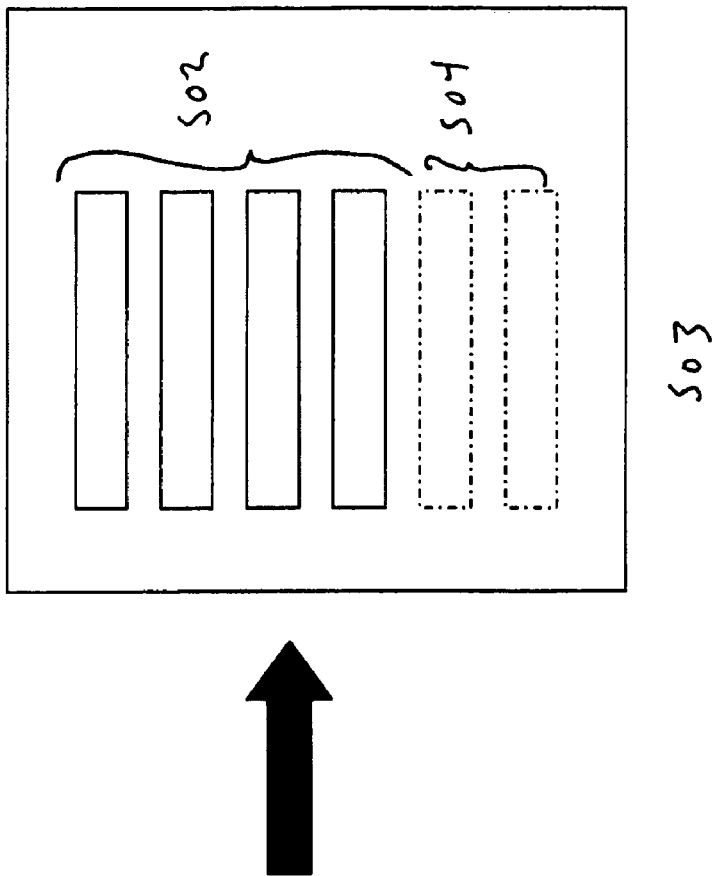
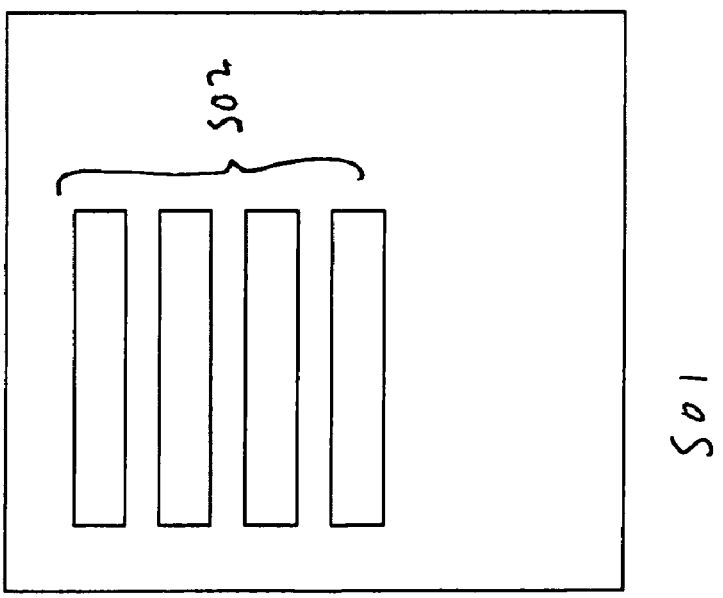
Fig. 5

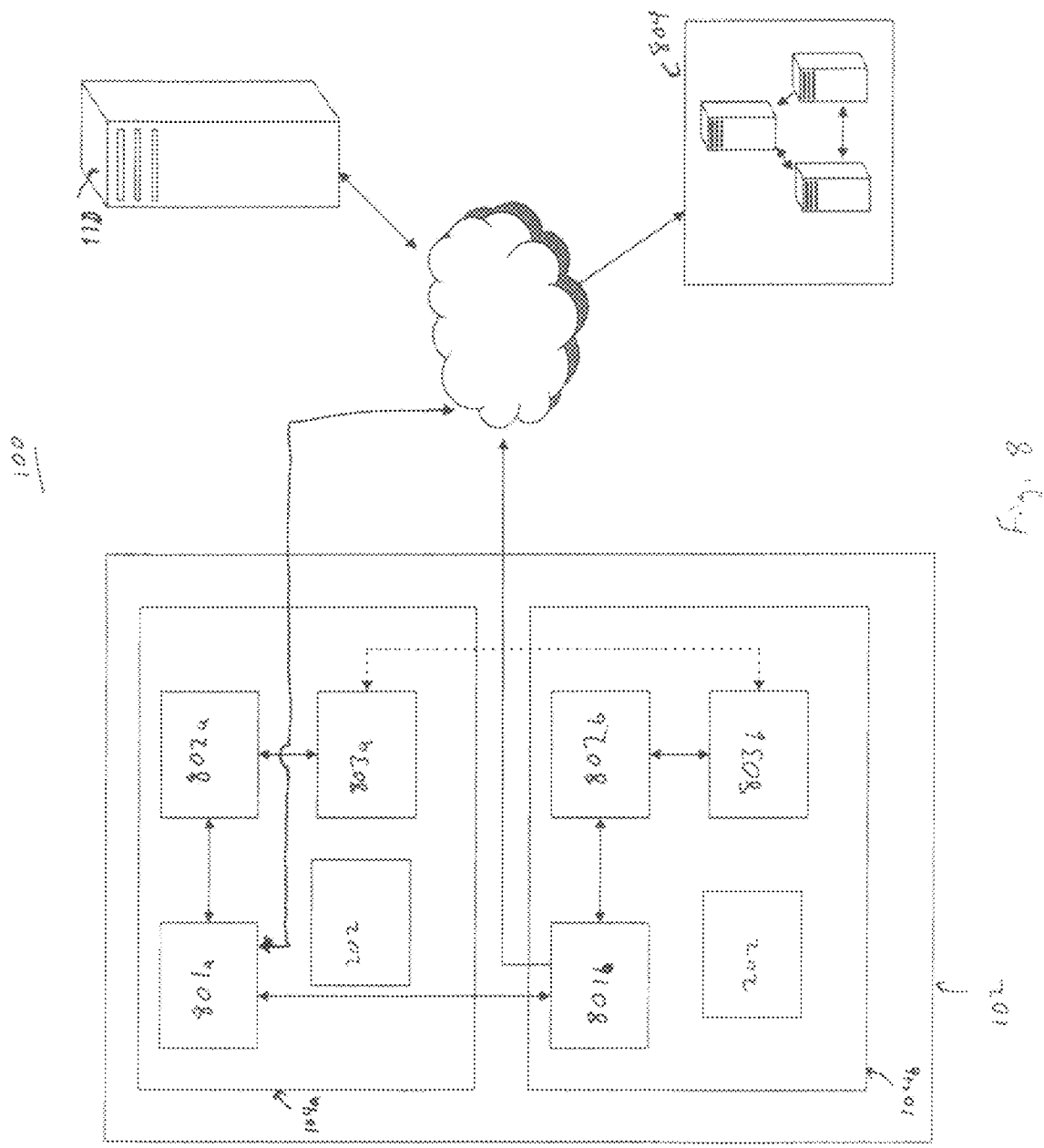

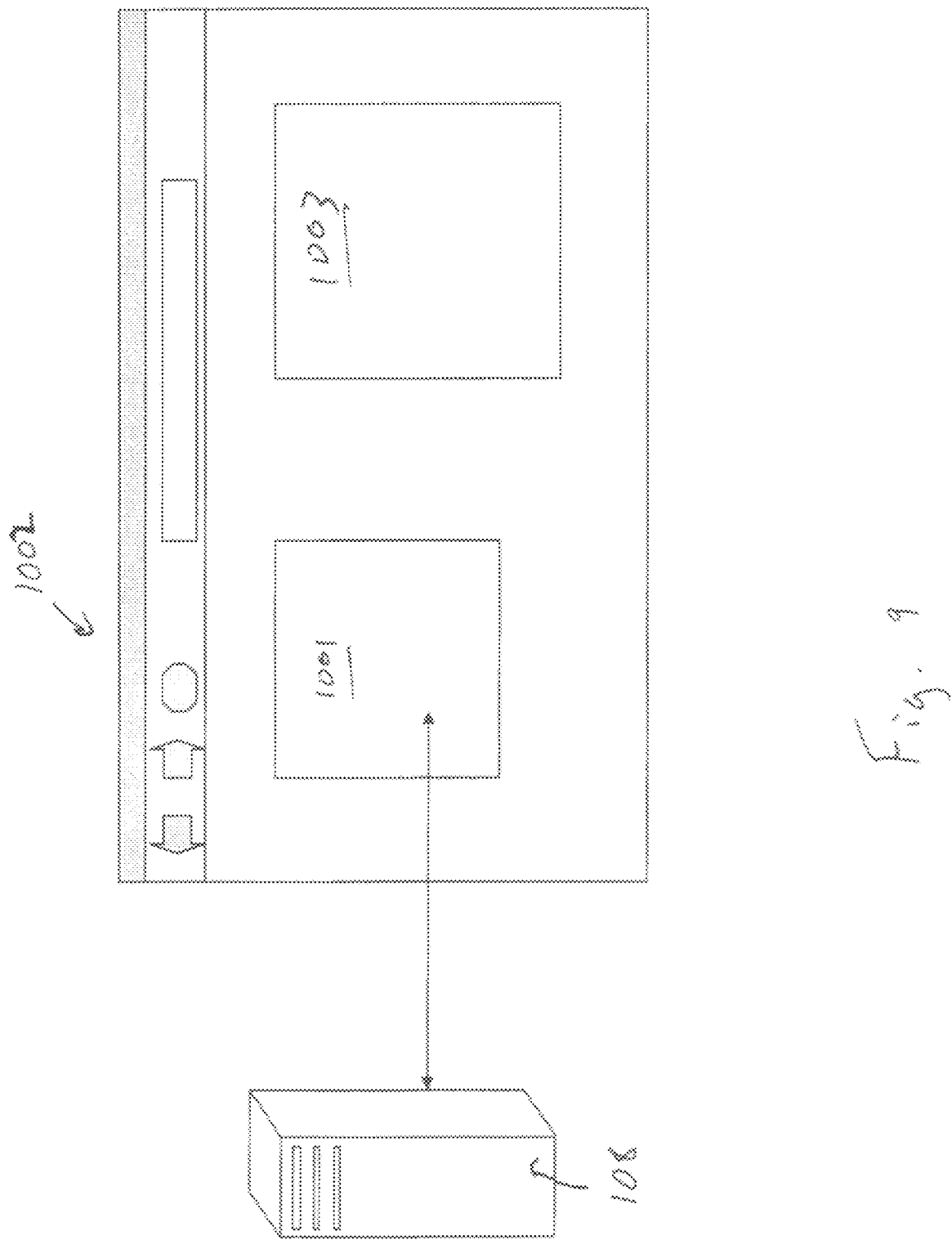

SYSTEM AND METHODS FOR DEFENDING AGAINST ROOT

CROSS REFERENCE TO RELATED APPLICATIONS

The present application claims the benefit of U.S. Provisional Application Ser. No. 60/926,614 filed Apr. 27, 2007, the contents of which are incorporated by reference herein in their entirety.

GOVERNMENT SPONSORSHIP

This invention was made with Government support under Contract No. FA8650-06-C-8050 awarded by USAF/AFMC. The Government has certain rights in this invention.

BACKGROUND

This disclosure is related to protection of a data, programs, and/or other material stored e.g., on a computer in disk or memory from viewing or copying by unauthorized parties.

On many computer operating systems the root level user account is a special user account used for system administration. For example, in Linux and other Unix-like operating systems, "root" is the user name or account that by default has access to all commands and files. It is also referred to as e.g. the root account, root user, or the superuser.

In many computing environments, it is desirable to provide authorized individuals access to sensitive material while protecting the sensitive material, (e.g. high value applications running in a cluster environment) from copying, tampering, and reverse engineering by unauthorized individuals. This may be particularly challenging in computing environments in which unauthorized users have substantial control over the computing environment, e.g. administrative or root level access. For example, a software developer might contract with university professors to conduct basic research and to develop critical software applications using a supercomputer cluster managed by a university. The developer would want to assure that this software cannot be viewed, altered, or copied by unauthorized persons while the software is running on the supercomputer. Preferably, the solution should not impose a performance penalty on the computing environment and should not cause significant inconvenience or annoyance to the developers of the software or to other users of the supercomputer. It is also desirable for the solution not to require an understanding of the internal workings of the sensitive material.

SUMMARY

The inventors have realized that the defense against root (DAR) systems and techniques described herein can be used to protect sensitive material on a computer system (e.g. a cluster of networked computers) from unauthorized access, including viewing or copying by persons or entities with root or administrative access in the computing system. Further DAR can, in some embodiments, improve system performance and provided additional network fabric within a particular cluster and allowing cluster nodes to talk to nodes in other clusters and nodes elsewhere on the Internet.

In one aspect a method is disclosed for securing sensitive material on a computer system including a network of computers from unauthorized access by a root level user of the computer system, the method including the steps of: limiting access to the sensitive material to one or more authorized users; and controlling the operation of one or more system functions to prevent unauthorized access to the sensitive material.

In some embodiments, controlling the operation of one or more system functions to prevent unauthorized access to the sensitive material includes denying user access including root level user access to the one or more system functions for a period of time based on the status of the sensitive material.

In some embodiments, controlling the operation of one or more system functions to prevent unauthorized access to the sensitive material includes denying user access including root level user access to the one or more system functions when the functions are directed at the sensitive material.

In some embodiments, controlling the operation of one or more system functions to prevent unauthorized access to the sensitive material includes not permitting the system function to proceed.

In some embodiments, controlling the operation of one or more system functions to prevent unauthorized access to the sensitive material includes producing an alarm in response to an unauthorized system function directed at the sensitive material.

Some embodiments include deleting or encrypting at least a portion of the sensitive material in response to the alarm, or taking other appropriate action such as notifying remote network nodes of the incident In some embodiments, controlling the operation of one or more system functions to prevent unauthorized access to the sensitive material includes: providing a list of allowed processes related to the sensitive material; intercepting a system function call directed to the sensitive material, the system function call corresponding to a process on the computer system; identifying the process corresponding to the intercepted system function call; and for identified processes not included in the allowed process list, not allowing the function call to proceed.

In some embodiments, the list of allowed processes corresponds to a list of ID values for the allowed processes, and identifying the process corresponding to the intercepted system function call includes obtaining a process identification value associated with the process.

Some embodiments include monitoring operation of the sensitive materials on the computer system using a remote monitoring unit. Root level access to the computer system does not provide root level access to the remote unit.

In some embodiments, providing the list of allowed processes related to the sensitive material includes determining, based on the remote monitoring or previous laboratory experiments or both, which processes are necessary for the operation of the sensitive materials.

In some embodiments, controlling the operation of one or more system functions to prevent unauthorized access to the sensitive material further includes analyzing system function calls corresponding to processes which are members of the list of allowed processes to determine information about performance of the processes.

In some embodiments, controlling the operation of one or more system functions to prevent unauthorized access to the sensitive material further includes rescheduling system function calls corresponding to processes which are members of the list of allowed processes to improve operation of the sensitive material.

In some embodiments, controlling the operation of one or more system functions to prevent unauthorized access to the sensitive material includes modifying an operating system of each of the computers of the network of computers.

In some embodiments, modifying an operating system of each of the computers of the network of computers includes associating a set of additional instructions with one or more operating system functions to provide modified system functions.

In some embodiments, modifying an operating system of each of the computers of the network of computers consists of inserting kernel level modules.

In some embodiments, the system functions are kernel level primitive functions, and modifying an operating system of each of the computers of the network of computers includes insertion of kernel level modules to operate within these functions.

Some embodiments include: providing an angel process on each of the computers of the computer network, respectively, each of the angel processes being inaccessible to the root level user; using the modified system functions, enabling communication between each of the angel processes and sensitive material residing on the respective computer; and for each of the angel processes providing a secure communication link with at least one other angel process.

Some embodiments include providing a secure communication link between at least one of the angel processes and a remote monitoring unit. Root level access to the computer system does not provide root level access to the remote unit.

Some embodiments include storing authenticating information in a remote unit. Root level access to the computer system does not provide root level access to the remote unit; and providing the authenticating information to an authorized user over secure communication links. Limiting access to the sensitive material to one or more authorized users includes allowing access to the sensitive material in response to receiving the authenticating information from the authorized users.

In another aspect, a system is disclosed for securing sensitive material on a computer system including a network of computers from unauthorized access by a root level user of the computer system, the system including: an authentication system for limiting access to the sensitive material to one or more authorized users; and for each computer in the network, a modified operating system having modified system functions for controlling the operation of one or more system functions to prevent unauthorized access to the sensitive material.

Some embodiments also include an angel process on each of the computers of the computer network, respectively, each of the angel processes being inaccessible to the root level user; and for each of the angel processes, a secure communication link with at least one other angel process. The modified system functions communicate with the angel processes and enable communication between each of the angel processes and portions of sensitive material residing on the computer on which the respective angel process resides.

In some embodiments, the modified operating system functions each include an unmodified operating system function and a set of additional instructions.

In some embodiments, the modified operating system of each of the computers of the network of computers includes an unmodified operating system and at least one modifying kernel level module.

Some embodiments include a remote monitoring unit in secure communication with at least one of the angel processes. Root level access to the computer system does not provide root level access to the remote unit.

Some embodiments include a remote unit for storing authenticating information and providing the authenticating information over a secure communications link to the authorized users. Root level access to the computer system does not provide root level access to the remote unit. The authentication system is configured to allowing access to the sensitive material in response to receiving the authenticating information from the In yet another aspect, disclosed is a computer-readable media containing a set of instructions that causes a computer system to perform a process for securing sensitive material on the computer system from unauthorized access by a root level user of the computer system, the method including the steps of: limiting access to the sensitive material to one or more authorized users; and controlling the operation of one or more system functions to prevent unauthorized access to the sensitive material.

Various embodiments may include any of the above features, alone or in combination.

DESCRIPTION OF THE DRAWINGS

The foregoing and other objects of this disclosure, the various features thereof, may be more fully understood from the following description, when read together with the accompanying drawings in which:

FIG. 5 is an illustration of a modified primitive function routine;

FIG. 7 is a flow diagram illustrating the screening of system function calls;

FIG. 8 is an illustration of an embodiment of a DAR system featuring an additional network fabric; and FIG. 9 is an illustration of a browser used to obtain user authorization from a remote server.

DESCRIPTION

The systems and techniques described below are generally applicable to any domain where there is a requirement to protect sensitive material, e.g., data, executables or source code against copying or viewing by unauthorized individuals or entities. Typical hacking techniques attempt to obtain administrative or root privileges to e.g., and take over the machine.

Figure 1:
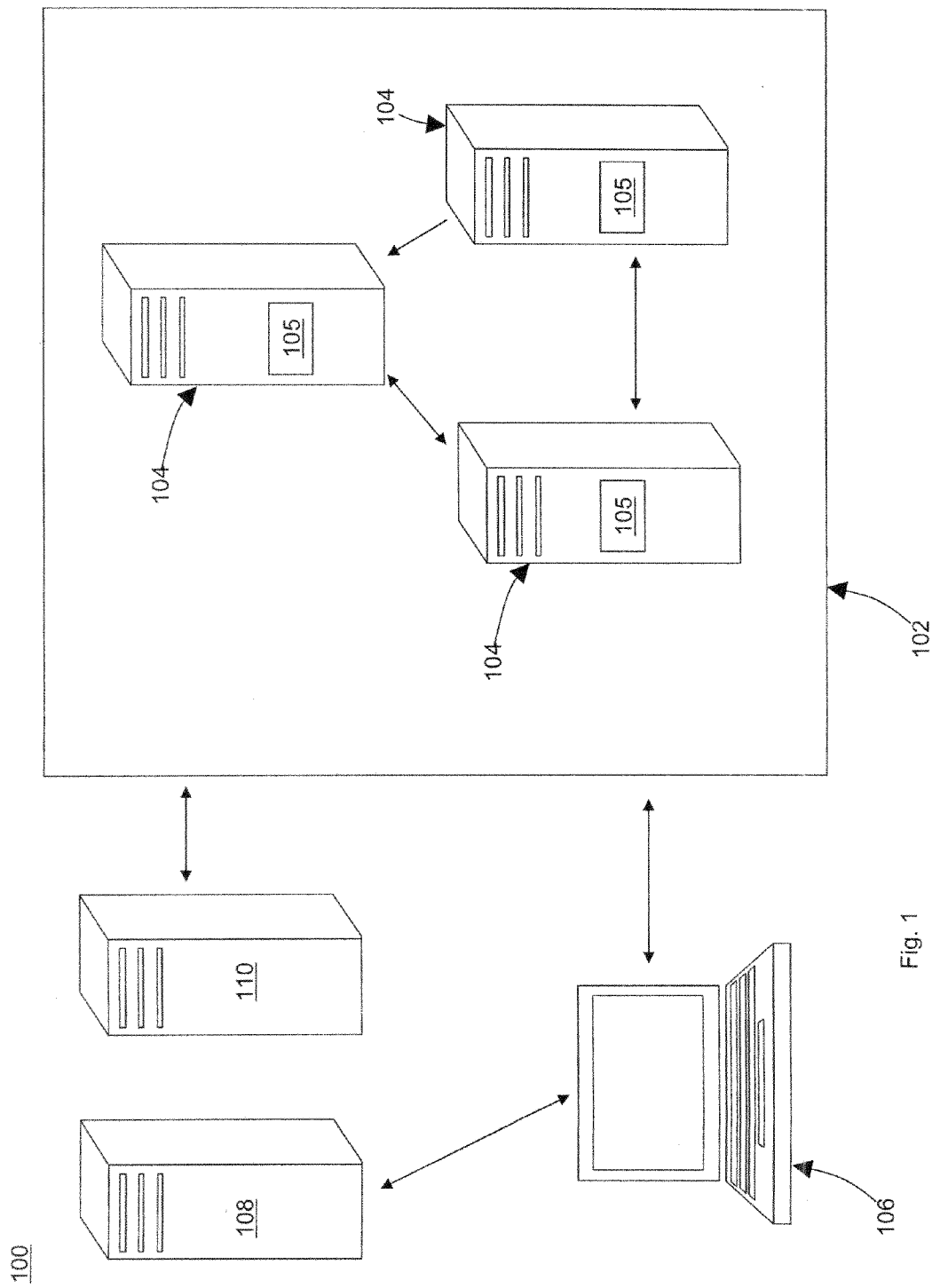
FIG. 1 is an illustration of an embodiment of a DAR system.

Referring to FIG. 1, a DAR system 100 protects sensitive material on computer cluster 102 made up of networked computers 104 each having an operating system 105. Operating systems 105 have been modified to prevent unauthorized access to sensitive material.

Portions of applications running on the computers 104 of cluster 102 can communicate using any of the many such schemes known in the art including, e.g. the well know message passing interface (mpi). Such communications schemes allow applications to run in parallel on nodes of cluster 102.

An authorized user 106 obtains an authentication key from remote server 108 (described in more detail below) to access sensitive material on cluster 104. A remote monitor 110 monitors cluster 102, e.g. by monitoring the operation of processes. In typical embodiments additional users (not show)

also interact with cluster 102, including additional authorized users and/or users not authorized to access the protected, sensitive material.

For example, in some embodiments, cluster 102 may be a university Beowulf cluster, the authorized users consisting of, for example, a professor and colleagues who are conducting the sensitive application development research. Other unauthorized users might include other researchers (including, e.g., graduate and undergraduate students) using the cluster, and the system administrator.

The authorization required to access and/or operate the protected sensitive information is maintained on separate server 108 and is not available on the disk of cluster 102 on which the protected application is running (and so is not accessible even to a root level user of cluster 102). This authorization may be made available just in time, securely, from remote server 108 in order to allow the authorized user (but not the root administrator or anyone other than the authorized user) access to the areas of cluster 102 where the protected application is running. At this point, using the techniques described below, when the sensitive material is available in a vulnerable state (e.g. when a protected application is running on the cluster or protected data is available in an unencrypted state), the root administrator does not have access to certain areas of cluster 102.

Note that the above technique protects a defined set of material (e.g. data, executables, source code, etc.) from unauthorized viewing and copying by unauthorized persons and by root. The scope does not include, e.g., protecting all data on a given computer 104.

In typical settings, the problem of defense against root has several important practical and political constraints. Typically, DAR system 100 cannot impose a noticeable performance penalty or pose any significant burden on persons using the system. For example, in the university supercomputing setting all user groups typically measure cluster performance and are all acutely aware of performance measurements. They are using the cluster because they want to compute more rapidly. Consequently, little or no performance penalty should be imposed on the performance of cluster 102 by DAR system 100. The cluster users are typically not especially interested in security. If such users believe that performance is degraded or that DAR imposes undue burdens, they may oppose it, refuse to use it, or even sabotage it. If this happens, DAR system 100 will not be implemented and will eventually be abandoned. Accordingly, in some embodiments, limited user annoyance, limited performance penalty, and full automation are provided by DAR system 100.

Further, typically, the system administrator has a requirement to be able to maintain the cluster 102 in an operating condition. To the extent that the DAR system 100 prevents accomplishment of this administrative function, the system administrator will become annoyed with the DAR. DAR system 100 assures that in an emergency the system administrator can perform required administrative functions. Consequently, if an emergency occurs, or if a violation is detected or if a problem occurs in the operation of cluster 102, the protected data and software is rapidly deleted or encrypted by DAR system 100 and necessary control returned to the system administrator.

Figure 2:
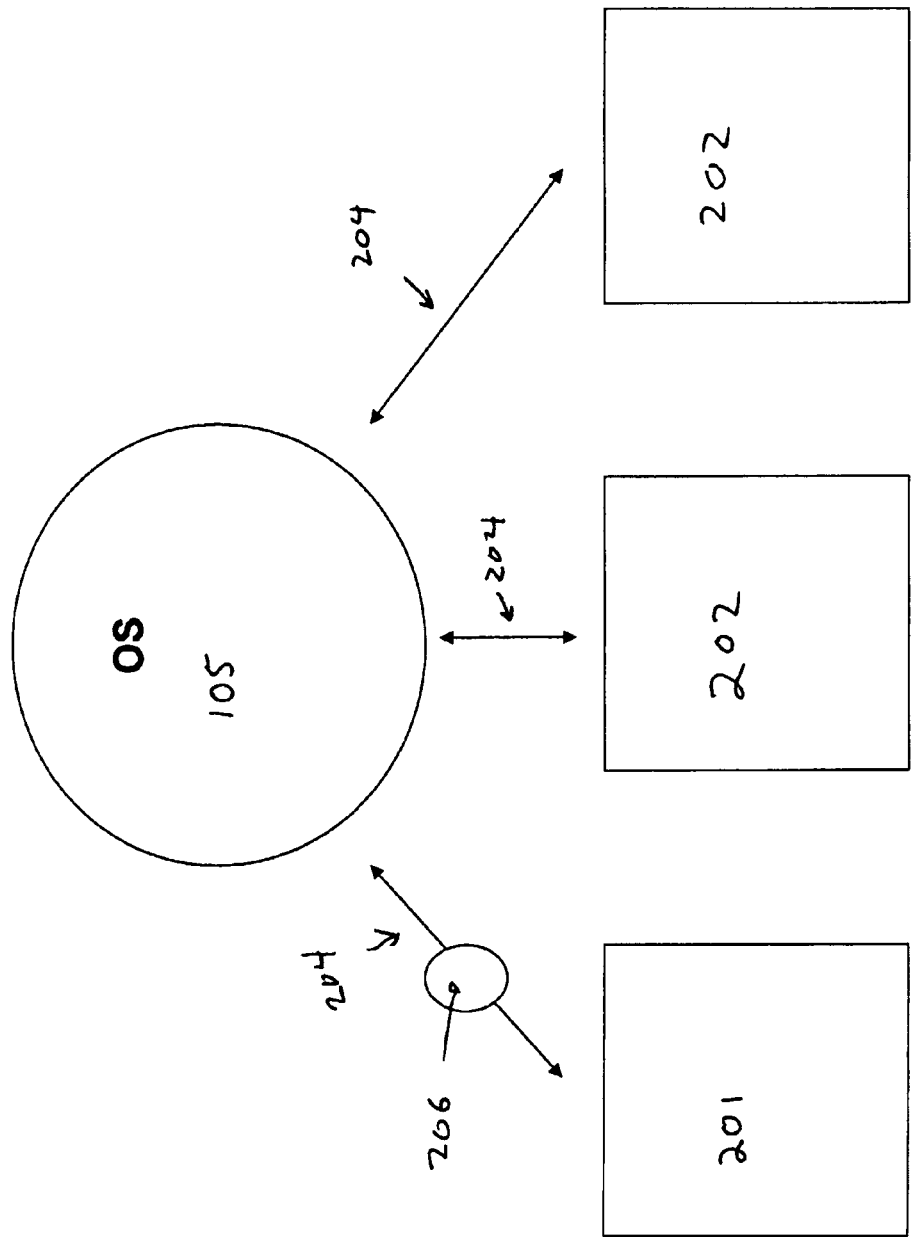
FIG. 2 is an illustration of the interaction of an operating system with various processes under a DAR system.

Referring to FIG. 2, the DAR system 100 protects sensitive material 201 from unauthorized access by even root level users by modifying operating system 105 of each computer 104 in cluster 102. Operating system 105 interacts with both protected sensitive material 201 and unprotected material 202 through primitive (e.g., kernel level) system functions 204. DAR system 100 modifies primitive system functions 204 to provide a screening layer 206 to screen out dangerous system functions directed at sensitive material 201.

Figure 3:
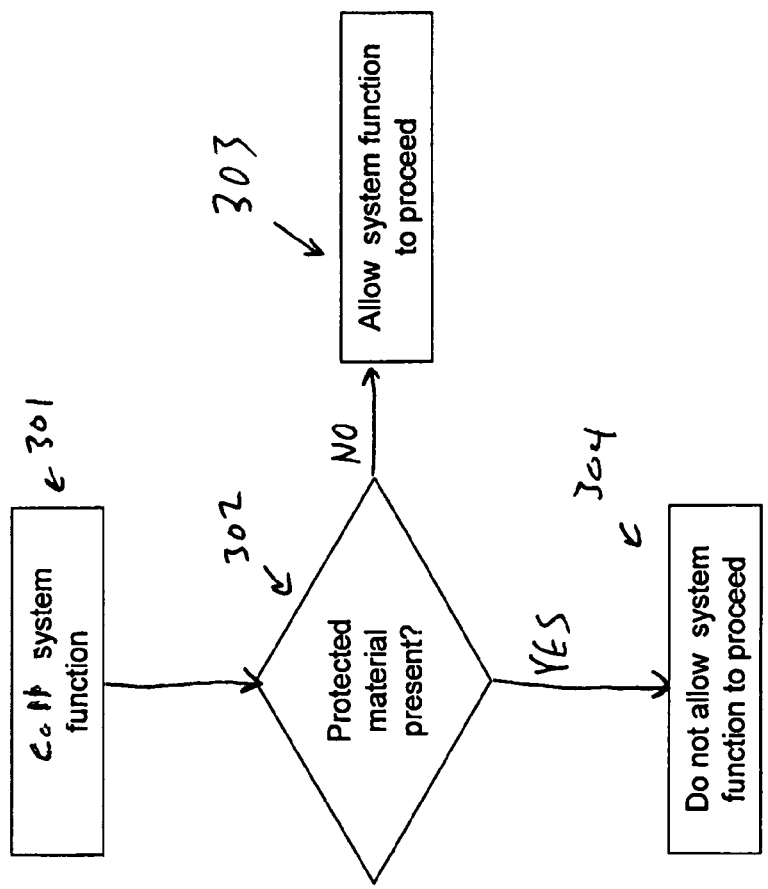
FIG. 3 is a flow diagram illustrating the screening of system function calls.

Some system functions, e.g. Linux functions such as ptrace (debugging), insmod and remmod (inserting and removing kernel modules), reboot (restarting the machine), etc. are potential security holes. Accordingly, in various embodiments of DAR system 100 screen 206 operates to deny access to these functions to root (or other users) on a given computer 104 while a sensitive material is present (e.g. when a protected application is running). For example, as shown in FIG. 3, in step 301 an operating system function is called by someone other than the authorized user (e.g. by a process other than those related to the protected sensitive material 201) on one of computers 104. In step 302, DAR system 100 determines if protected material is present on that computer. If no, in step 303 the system function is allowed to proceed. If yes, in step 304, the system function is terminated before it can interact with sensitive material 201.

This process is particularly suitable for screening out very dangerous system functions (e.g. the Linux ptrace primitive) in situations where cluster 102 has no users other than the authorized user. In such cases, there is no reason why the root administrator or anyone except the authorized user would need to run the dangerous function.

Figure 4:
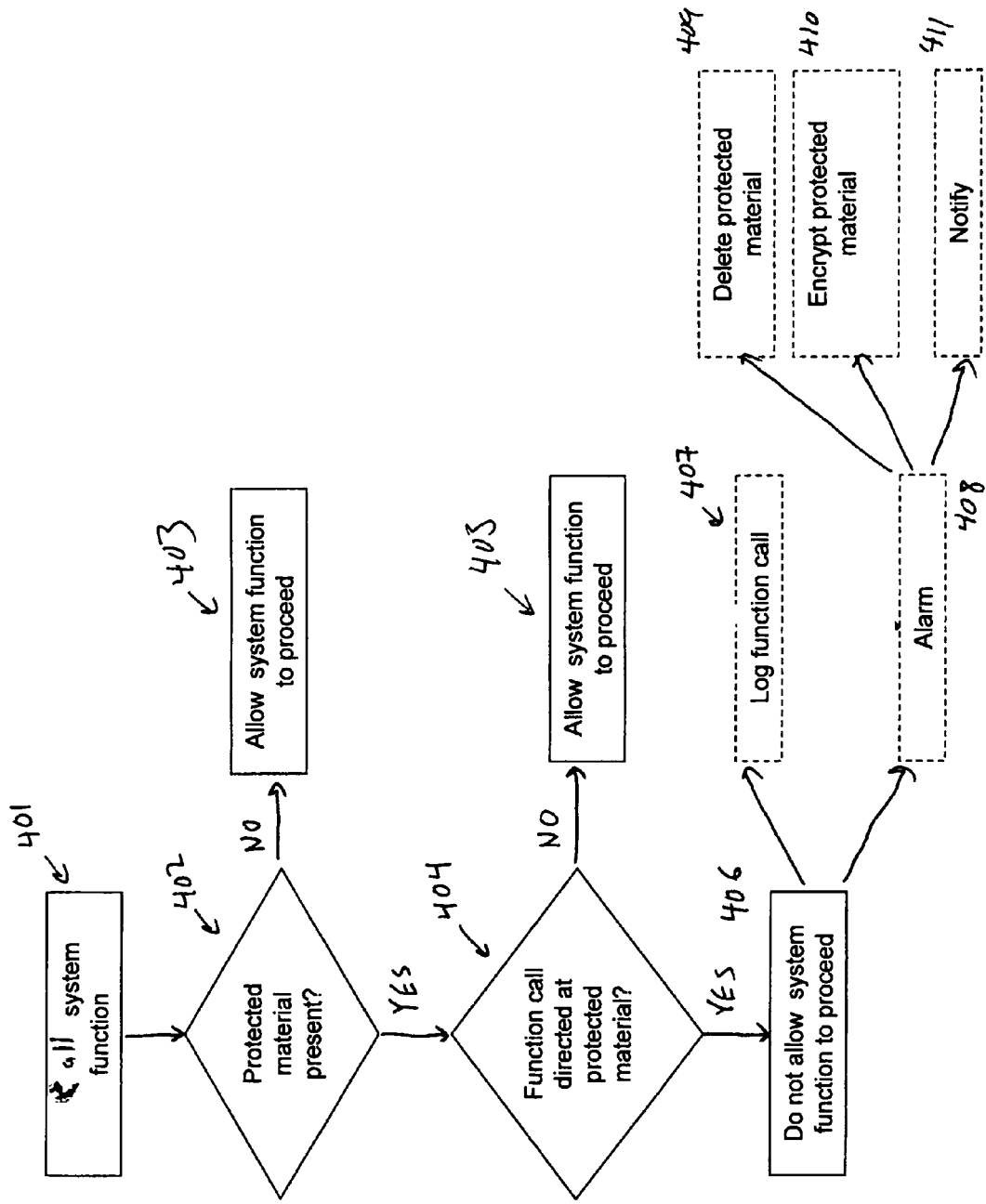
FIG. 4 is a flow diagram illustrating the screening of system function calls.

However, in other cases, e.g. as shown in FIG. 2, where protected material 201 includes a protected application which may run in an environment with other users running unprotected applications 202. In such case, the appropriate procedure is to prohibit dangerous primitives from interacting with to the protected applications. Such a procedure is shown in FIG. 4. In step 401, a system function is called. In step 402, DAR system 100 determines if protected material 201 is present on the relevant computer 104. If no, in step 403 the system function is allowed to proceed. If yes, in step 404 DAR system 100 determines if the function call is directed at protected sensitive material 201. If no, in step 405 the system function is allowed to proceed. If yes, in step 406 the system function is terminated before it can interact with sensitive material 201. In addition (or the alternative) to terminating the function, the DAR system can take other appropriate actions. For example, in optional step 407 a record of the function call can be logged (e.g. including information identifying the user or process responsible for the call). In optional step 408, an alarm is produced. The alarm can trigger additional actions such as deletion or encryption of the targeted protected material as shown in optional steps 409 and 410. In optional step 411, the alarm triggers a notification action, e.g. notifying other computers 104 or remote monitor 110 of a possible attempted intrusion.

In typical settings, the root administrator will not readily agree to being deprived of access to certain key functions (e.g. Linux functions such as reboot, insmod, and rmmod). In such cases, DAR system 100 can operate such that if access to these functions by root is required, the material being protected is deleted from, or encrypted on, the computer 104 on which access to the functions is required and then root can be given access to these functions.

In some embodiments, screening processes of the type described above are implemented by modifying operating system 105 to make changes to the operating system primitive functions. Referring to FIG. 5, prior to modification, operating system 105 had unmodified system function 501 consisting of steps 502. Under DAR system 100, additional steps 504 are appended to steps 502 to produce modified system function 501.

Some functions in an operating system, e.g. Linux or any other operating system, have significant security consequences but occur relatively infrequently. For example, in Linux, the primitives for opening files or examining directories are potentially very dangerous but, in many settings, occur very infrequently during operation of sensitive material on cluster 102. Accordingly, various embodiments of the screening methods disclosed herein work to control the operations of these primitives so as to screen out unauthorized attempts to copy or view protected data. Since these functions occur very infrequently, this screening will have an unnoticeable impact on performance.

For example, consider the case where sensitive material 201 is an application and a given primitive system function, e.g. the Linux primitive open, is called about 10,000 times on one computer 104 in the course of a 30 minute run of the application. Such a primitive is an excellent candidate to screen out unauthorized accesses to protected material. Having the open primitive perform a few more instructions will be unnoticeable in the flow of trillions of instructions that will be executed in course of one half hour of processing. However, even for relatively rarely used primitives, care must be taken not to add too many steps. In typical applications, ten instructions or even a 1,000 instructions times 10,000 is relatively trivial over a half hour period, but 10 million instructions times 10,000 is not.

Figure 6:
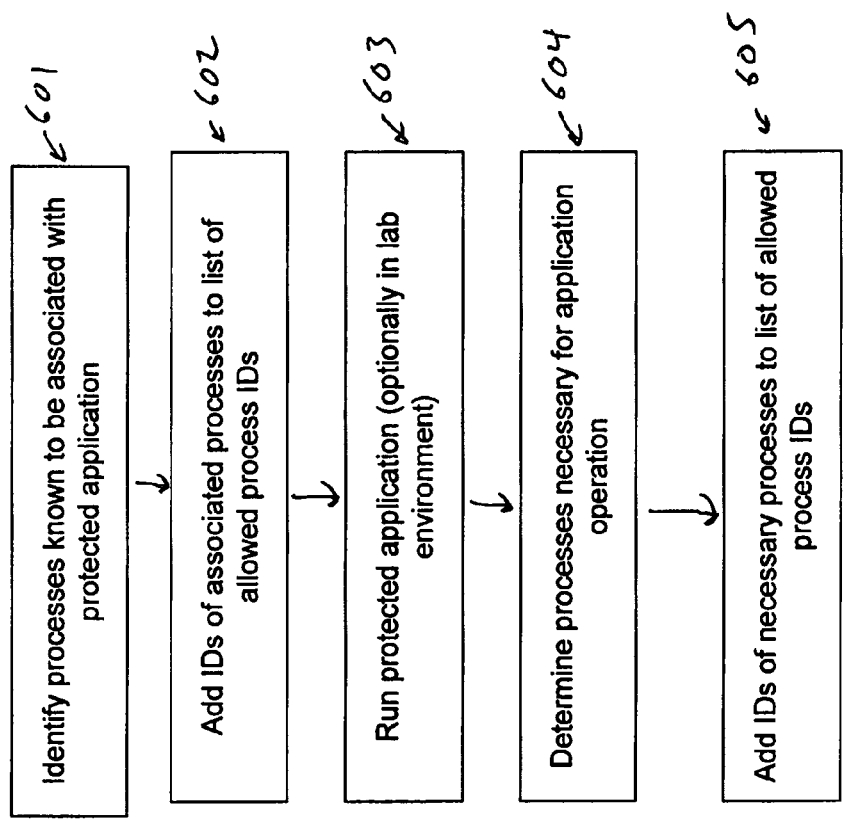
FIG. 6 is a flow diagram illustrating the generation of an allowed process list.
Figure 4:
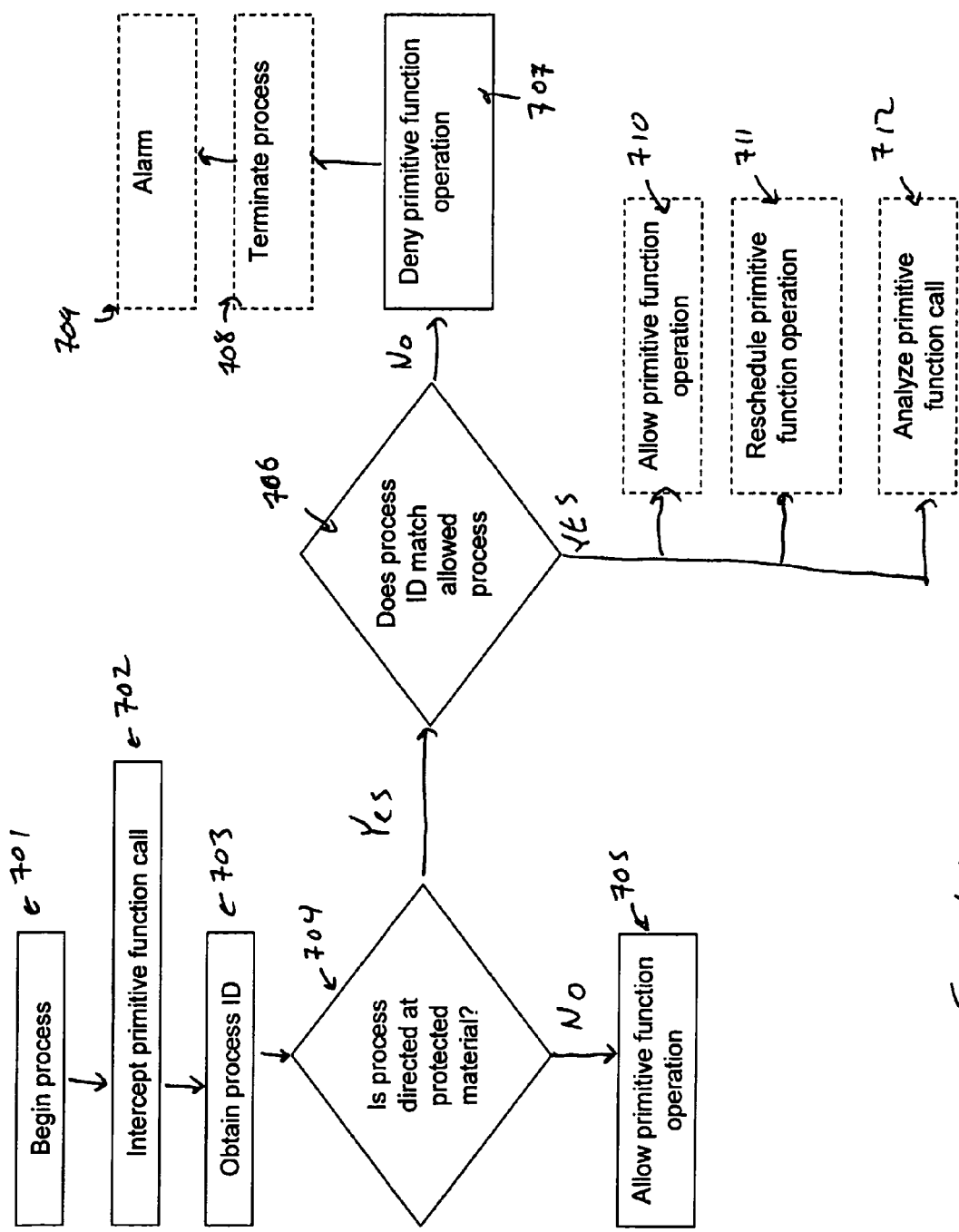

The following describes an efficient technique for screening system functions. Referring to FIG. 6, in a first step 601 DAR system 100 identifies known process that are permitted to execute with a disk or memory area that the system wishes to protect. These processes are associated with specific applications that the node will run that need to be protected from theft as well as critical applications that are needed to support these applications. All processes will have associated process IDs, typically consisting of a numerical value. In step 602, the IDs of identified processes are added to a list. In step 603 the protected application is run in test mode, possibly in a laboratory environment. In step 604, the system is examined to determine which processes are needed for operation. In step 605 the IDs associated with the processed identified by the test run are added to the list of allowed processes.

As described below, after this initial identification activity, which typically occurs only once, DAR system 100 will screen system function calls to allow only this list of processes to interact with protected material (i.e. to execute within the protected memory and disk areas on the target node).

In various embodiments, DAR system 100 operates to intercept primitives that give access to disk, memory, and process executables at, e.g. the kernel (Linux, Unix, Unix-like) or ring 0 (Windows related) level under a variety of operating systems, including real time operating systems (RTOS). If the target directory or memory area or application is sensitive material that the system wishes to protect, system 100 examines the process id of the requesting process and to allow only known processes to execute.

For example, as shown in FIG. 7, in step 701, a process begins which calls a system function which has been modified by DAR system 100 (e.g. as shown in FIG. 5) to include additional instructions. In step 702, these additional instructions intercept the function call and, in step 703, obtain the process ID for the process which called the function. Step 704 determines if the process in directed to protected material. If not, in step 705, the function is allowed to operate, and the process continues.

If the process is directed at protected material, step 706 determines if the process ID matches an ID on a list of allowed processes, e.g. generated using the techniques described above. If no, in step 707, the function is terminated before it can interact with sensitive material (i.e. the function call returns to the process without taking any action). Optionally, in steps 708 and 709 the process which made the function call may be terminated, an alarm may be produced, and/or other suitable actions may be taken.

If the process ID does match an ID on the allowed list, in step 710, the function may be allowed to operate. Optionally, in steps 711 and 712, the function may be rescheduled or analyzed to improve performance, as discussed in greater detail below.

In the process described above, when the primitive 15 intercepted, a short code segment is run which examines the process id of the process requesting access, and if the id not on the approved list, and the access request is a protected area, denies access and returns without further processing. This is a very rapid calculation compared to more computationally expensive attempts to examine the entire contents of a process against a list of prohibited signatures that are considered dangerous.

In some embodiments, it is preferable to modify operating systems 105 without modifying the kernels of the systems. One reason not to modify the kernel is to avoid introducing code that will break working portions of the kernel. On the other hand, the techniques described herein require control of the functionality of kernel primitives. In some embodiments, DAR system 100 makes minimal modifications to the kernel itself, thereby keeping the goal of not breaking code that works, and adding security functionality through the use of kernel modules. Since the modules can be easily inserted and removed, this facilitates the process of testing the security to demonstrate that it does not impose a performance penalty. This is useful, for example, in the university computer cluster environment where, if the users cannot be assured that security does not impose a performance penalty, the users will be very opposed to the security enhancements and politics may prevent implementation.

This same strategy can be carried to any other environment. If the users believe that the security is hindering attainment of the functionality they expect from the computer, they will fight against installing the security features. The loadable kernel module approach allows for the system to be exercised with and without security, which can demonstrate conclusively to the users that there is no performance degradation resulting from the security.

One might suspect that when providing additional security against root, the system will run more slowly since the system is performing more tasks. This, however, is not necessarily the case.

As discussed above in this disclosure, in various embodiments, DAR system 100 limits the intervention in system performance to tasks that occur with relative infrequency, and therefore performance degradation will be almost unnoticeable. Further, in some embodiments, the DAR system acts to increase system performance by adding security.

Normally, when administrators configure a cluster they delete what they believe are unnecessary system functions. However, this process is imperfect, and they do not identify all the unnecessary functions, because they cannot be certain that these functions really are unnecessary.

However, DAR system 100, by actually intervening in functions, allows for empirically experimentation with which kernel functions really are necessary to keep the system running and how often these functions really need to run in order to keep the system running. For example, referring to FIG. 7, in optional step 712, a primitive function determined to be associated with an allowed process ID can be analyzed to determine information about system performance. This information can be used to improve system performance. As described in more detail below, the experimentation and analysis techniques described above can be controlled remotely (e.g. using remote monitor server 110), and can be used to implement real time, on-the-fly improvement in system performance.

The DAR system, by intervening in certain system primitives to provide screening against unauthorized intervention, can, at the same time, schedule other authorized but non-critical functions to run more slowly or not run at all. For example, if some system function is running every 1000 milliseconds DAR system 100 determines that 2000 milliseconds will still work, a certain number of machine cycles are saved. Referring to FIG. 7, in optional step 711, a non-critical primitive function associated with an allowed process ID can be rescheduled to improve system performance. In some embodiments, by manipulating these safe but non-critical functions, DAR system 100 can be able to more than regain the machine cycles that we expended in the screening process.

In some cases, it is important that one not make the material protected by DAR system 100 more run more rapidly at the expense of another legitimate user of the cluster. This is typically not politically viable. Accordingly, the DAR system operates to allow the protected application run more rapidly only at the expense of other non-critical system functions that can run more slowly or not at all without affecting cluster performance.

In some embodiments, DAR security system 100 may also provide for improved cluster design, e.g., through increased connectivity.

The systems and techniques described above act to make minor modifications to the operating systems 105; to experiment with light examination of system primitives that run infrequently; and to control the examination process from a remote server 108.

In order to implement such a scheme, DAR system 100 overlays a lightweight control structure on the cluster that cannot be penetrated by root or by anyone else not authorized with values that are remotely maintained. Some embodiments employ agents that make up this control structure, referred to herein as "angels."

For example, referring to FIG. 8, angel agents 801a and 802b reside on computers 104a and 104b of cluster 102. Angel agents 801a and 801b cannot be access by unauthorized users, including the root level user. Angel agents 801a and 801b are in secure communication with each other. Angel agents 801a and 801b are also in secure communication, e.g. via the internet with remote monitor 110, and can, in principal connect securely with any node accessible over the internet, e.g. with a node of cluster 804.

Further, angel agents 801a and 801b interact securely with modified system primitive functions 802a and 802b respectively. Modified system primitive functions 802a and 802b, in turn, interact securely with protected sensitive material 803a and 803b. Accordingly, sensitive material 803a can pass a message through primitive functions 802a to angel agent 801a, then on to angel agent 801b, through primitives 802b to protected sensitive material 803b. The reverse chain works as well. Note that this communication link is in addition to the usual communication system provided by network cluster 102 (e.g. a message parsing interface, as indicated by dashed double arrow). Similarly, protected material can communicate through the angel agents with any other node on the internet, including cluster 804 and remote monitor 110.

Thus DAR system 100 provides a network fabric consisting of angels and various system primitives modified to permit screening which could be used to enhance the performance of a protected application. As in the example above, DAR system 100 may provide a method of securely communicating with any node anywhere on the Internet. It also provides an additional layer of communication paths within cluster 102. A protected application may be enhanced to communicate through the DAR fabric. These modifications can allow any node in the cluster to communicate with another node in the cluster or with some other node located anywhere else on the Internet. DAR security system 100 also serves as a second communications structure similar to the message passing interface (mpi) commonly used in cluster applications. Consequently, the security structure could be used to tie several clusters together (e.g. clusters 102 and 804 as shown in FIG. 8) or to enhance a specific cluster by providing additional communication paths among existing nodes. The structure provided by DAR system 100 provides a network fabric that can be designed in a theoretically limitless number of configurations.

Because, in various embodiments, DAR system 100 has some advantages other than adding security (which most users do not care about), the users will be less inclined to sabotage. The prospect adding a DAR and providing limitless network fabric for model development will have a significant appeal.

As used herein, "angel" agents refers to agents residing on nodes of a cluster which capable of securely communicating with one another and with the modified system primitives functions of employed by a DAR system. In various embodiments, the angel agent may be an intelligent agent, having capabilities such as secure networking communication, secure remote management, just in time creation, and secure host authentication. Examples of such agents are further described in U.S. Pat. No. 6,067,582 issued May 23, 2000, U.S. Pat. No. 6,532,543 issued Mar. 11, 2003, and U.S. Pat. No. 6,918,038 issued Jul. 12, 2005, each of which are incorporated herein by reference in their entirety.

If the protected application is to run without a performance penalty, most of the protected sensitive material will need to be unencrypted at run time. Otherwise, there will be noticeable performance penalty.

Consequently, the general strategy of protecting data in a remote location is to transfer the data to the remote location at the last possible moment, decrypt the application and its supporting data just before the application is run, and to destroy or re-encrypt the protected data after it has finished running or upon detection of an alarm. However, in the case of a, for example, a university user running a protected model on a Beowulf cluster, the user may work with the model and its supporting data for an extended period of time before actually running the model, and may attempt to start and stop the model numerous times. Under this paradigm, the protected data would be on the cluster unencrypted for an extended period. The authorized user could cause the data be encrypted when he or she finished a work session on the remote cluster. The data would be decrypted when the user logged in for the next session. A similar approach would be suitable for protecting data on a, e.g., a networked tablet PC maintained by a in the field When an unauthorized user attempts to view or copy protected data, DAR system 100, using e.g. the techniques described above, detects the attempt, blocks it from execution, and alarms the system. When the system is alarmed, possible responses include encrypting or destroying protected data; communicating with remote control nodes; and logging the attempt. If an attack is sensed, time may be of the essence. Consequently, the alarm response may encrypt or destroy data in an order that corresponds to the security priority of the data.

When the encryption option is taken, a preferred practice is to use a key that has been securely transferred from a source outside of the chain of command of the local machine, and maintain the key on a remote server, rather than storing the encrypting key on the local disk or leaving it in memory.

There are attacks on DAR system 100 that could be sensed from external sensors. Examples include: a forced entry into the computer room, an attempt to remove a disk, a system shutdown, or, imminent capture, end of mission and so forth. In these cases, it would be advisable to be able to send an alarm to the DAR system 100 so that critical data could be destroyed or encrypted before the machine was captured by an adversary.

In some embodiments, an authorized used (e.g. a professor developing protected software on a university Beowulf cluster) would typically interface with the cluster using a secure connection, e.g., ssh running over Linux. DAR system 100 requires that the user, using the secure connection, to provide credentials to obtain authorization to work in the projected areas of cluster 102. For these purposes, the connection (e.g. using secure web-based protocols know in the art) has to be very secure.

Referring to FIG. 9, the authorized user 106 obtains the necessary credentials from secure server 108 using a browser interface 1002. Browser interface 1002 allows the authorized user to view information 1003 about operations on cluster 102. Browser interface 1002 does not reveal data that is protected but simply provide administrative details about the cluster. If we could provide the professor with a view of the Beowulf cluster using a browser that the professor did not otherwise have, this would be another reason to use the defense against root system.

The techniques presented in this disclosure provide many possibilities for defending against root. The important point is to maintain key material in a different, remote chain of command, not to cause a performance penalty, provide automated operation, and not impose a hardship on the various users, including root.

One or more or any part thereof of the systems, methods, techniques, etc. described above can be implemented in computer hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The technique can also be implemented as a computer-readable storage medium, configured with a computer program, where the storage medium so configured causes a computer to operate in a specific and predefined manner to perform the functions described herein.

It is to be understood that although examples are shown above with computer clusters featuring two or three networked computers, and number of computers, including a single computer may be used. It is also to be understood that although example have been provided referencing specific operating systems, function call, communication systems, etc. these examples are not meant to be limiting. The techniques, methods, and systems described above may be applied in any type of computing environment.

In the event that the definition of any technical terms appearing in any documents incorporated by reference conflict with definitions found in this application, it is to be understood that the meaning set forth in the current application holds.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for securing sensitive material, comprising:
operating, by a computer system, a modified kernel of an operating system for screening one or more modified primitive system functions of the modified kernel of the operating system, wherein the one or more modified primitive system functions include identification value (ID);
intercepting, by the computer system, at the modified kernel of the operating system, the one or more modified primitive system functions, each called by a process having an associated process identification value (ID);
determining by the one or more modified primitive system functions, executed by the computer system, whether the one or more intercepted primitive system functions are directed to sensitive material residing on the computer system;
in response to a determination that the intercepted primitive system functions are directed to said sensitive material,
comparing the intercepted primitive system functions IDs with a list of allowed process IDs;
allowing or denying, by the one or more modified primitive system functions, executed by the computer system, operation of the intercepted one or more modified primitive system functions during runtime to prevent unauthorized access by a root-level user of the computer system to said sensitive material residing on the computer system based on a list of allowed process IDs, and responsive to a determination that the intercepted primitive system function is directed to said sensitive material; and
monitoring, by a remote monitoring unit, operation of said sensitive materials residing on the computer system, wherein root level access to said computer system does not provide root level access to said remote monitoring unit.

2. The method of claim 1, further comprising denying, by the computer system, user access including root level user access to said one or more modified primitive system functions for a period of time based on the status of said sensitive material.

3. The method of claim 1, further comprising denying, by the computer system, user access including root level user access to said one or more modified primitive system functions when said one or more modified primitive system functions are directed at said sensitive material.

4. The method of claim 3, further comprising not permitting, by the computer system, said one or more modified primitive system functions to proceed.

5. The method of claim 1, further comprising producing, by the computer system, an alarm in response to an unauthorized modified primitive system function directed at said sensitive material.

6. The method of claim 5, further comprising deleting or encrypting, by the computer system, at least a portion of the sensitive material in response to said alarm, or taking other appropriate action such as notifying remote network nodes of the incident.

7. The method of claim 1, further comprising:
  providing, by the computer system, a list of allowed processes related to the sensitive material;
  intercepting, by the computer system, at the modified kernel of the operating system, a modified primitive system function call directed to said sensitive material, said modified primitive system function call corresponding to a process on said computer system;
  identifying, by the computer system the process corresponding to the intercepted primitive system function call; and
  for identified processes not included in the allowed process list, not allowing, by the computer system, the intercepted primitive system function call to proceed.

8. The method of claim 7, wherein the list of allowed processes corresponds to a list of ID values for the allowed processes, and the method further comprising obtaining a process identification value associated with the process.

9. The method of claim 7, further comprising determining, based on a remote monitoring or previous laboratory experiments or both, which processes are necessary for the operation of the sensitive materials to provide the list of allowed processes.

10. The method of claim 7, further comprising analyzing, by the computer system, modified primitive system function calls corresponding to processes which are members of the list of allowed processes to determine information about performance of said processes.

11. The method of claim 7, further comprising rescheduling, by the computer system, modified primitive system function calls corresponding to processes, which are members of the list of allowed processes to improve operation of the sensitive material.

12. The method of claim 1, wherein modifications to each of the one or more modified system functions comprises associating a set of additional instructions with each of the one or more modified primitive system functions.

13. The method of claim 1, further comprising:
  providing an angel process on the computer system and one or more networked computer systems, respectively, each of said angel processes being inaccessible to the user;
  enabling, by the one or more modified primitive system functions, communication between any of said angel processes, the modified kernel, and sensitive material residing on the computer system and the respective networked computer system; and
  for each of said angel processes providing a secure communication link with at least one other angel process.

14. The method of claim 13, further comprising providing a secure communication link between at least one of the angel processes and said remote monitoring unit, wherein root level access to said computer system does not provide root level access to said remote monitoring unit.

15. The method of claim 1, further comprising:
  storing authenticating information in said remote monitoring unit, wherein root level access to said computer system does not provide root level access to said remote monitoring unit;
  providing said authenticating information to an authorized user over secure communication links; and
  allowing access to said sensitive material in response to receiving said authenticating information from the authorized users.

16. The method of claim 1, wherein the one or more modified primitive system functions comprising a disk access, a memory access, or any combination thereof.

17. The method of claim 1, wherein the one or more modified primitive system functions comprising a ptrace, an insmod, a rmmod, an open, or any combination thereof.

18. The method of claim 1, wherein the operating system is linux.

19. The method of claim 1, wherein the operating system is windows or a real time operating system (RTOS).

20. A system for securing sensitive material residing on a computer system, comprising:
  a computer system comprising one or more networked computers; and
  a separate authentication server in communication with the computer system, each networked computer of the computer system configured to have sensitive material residing thereon, the server configured to permit access to said sensitive material to one or more authorized users, wherein each of the one or more networked computers comprises an operating system having a modified kernel for intercepting at runtime, at the modified kernel of the operating system, one or more modified primitive system functions of the modified kernel of the operating system and allowing or denying, at the modified kernel, operation of the one or more modified primitive system functions, each having an associated process identification value (ID), to prevent at least in part by the modified primitive system functions, unauthorized access by a root-level user of the computer system to said sensitive material based on a list of allowed process IDs,
  wherein allowing or denying is performed by comparing the intercepted modified primitive system functions IDs with the list of allowed process IDs, and
  wherein the root level access to said computer system does not provide root level access to a rmote unit.

21. The system of claim 20, further comprising
  a plurality of angel processes, wherein a respective angel process of the plurality of angel processes is provided on each of the one or more networked computers of the computer system, respectively, each angel process of said plurality of angel processes being inaccessible to the user; and
  for each angel process of said plurality of angel processes, a secure communication link with at least one other angel process;
  wherein the one or more modified primitive system functions communicate with each angel process of the plurality of angel processes and enable communication between each angel process of the plurality of angel processes and portions of sensitive material residing on the networked computer of the computer system on which the respective angel process resides.

22. The system of claim 21, wherein said remote unit is in secure communication with at least one of the angel processes, wherein root level access to said computer system does not provide root level access to said remote unit.

23. The system of claim 20, wherein the modified kernel of the operating system permits examination of modified primitive level function requests before the requests are executed and permits blocking the modified primitive level requests from executing.

24. The system of claim 20, wherein the modified kernel comprising an unmodified operating system and at least one modifying kernel level module.

25. The system of claim 20, further comprising the remote unit for storing authenticating information and providing said authenticating information over a secure communications link to the authorized users, wherein said authentication
- allowing or denying, by the one or more modified primitive system functions, operation of the intercepted one or more modified primitive system functions during runtime to prevent unauthorized access by said user of said computer system to said sensitive material based on a list of allowed process IDs, and responsive to a determination that the intercepted primitive system function is directed to said sensitive material; and
- monitoring, by a remote monitoring unit, operation of said sensitive materials residing on the computer system, wherein root level access to said computer system does not provide root level access to said remote monitoring unit.

26. A non-transitory computer-readable media comprising a set of computer instructions, which responsive to being executed by a computer system, causes the computer system to perform operations comprising:
- operating a modified kernel of an operating system on the computer system to screen one or more modified primitive system functions of the modified kernel of the operating system, wherein the one or more modified primitive system functions include identification value (ID);
- intercepting, at the modified kernel of the operating system, the one or more modified primitive system functions, each called by a process having an associated process identification value (ID);
- determining by the one or more modified primitive system functions whether the intercepted one or more primitive system functions are directed to sensitive material residing on the computer system;
- in response to a determination that the intercepted modified primitive system functions are directed to said sensitive material,
- comparing the intercepted primitive system functions ID with a list of allowed process IDs;
- allowing or denying, by the one or more modified primitive system functions, operation of the intercepted one or more modified primitive system functions during runtime to prevent unauthorized access by said user of said computer system to said sensitive material based on a list of allowed process IDs, and responsive to a determination that the intercepted primitive system function is directed to said sensitive material; and
- monitoring, by a remote monitoring unit, operation of said sensitive materials residing on the computer system, wherein root level access to said computer system does not provide root level access to said remote monitoring unit.

* * * * *